Figure 1:
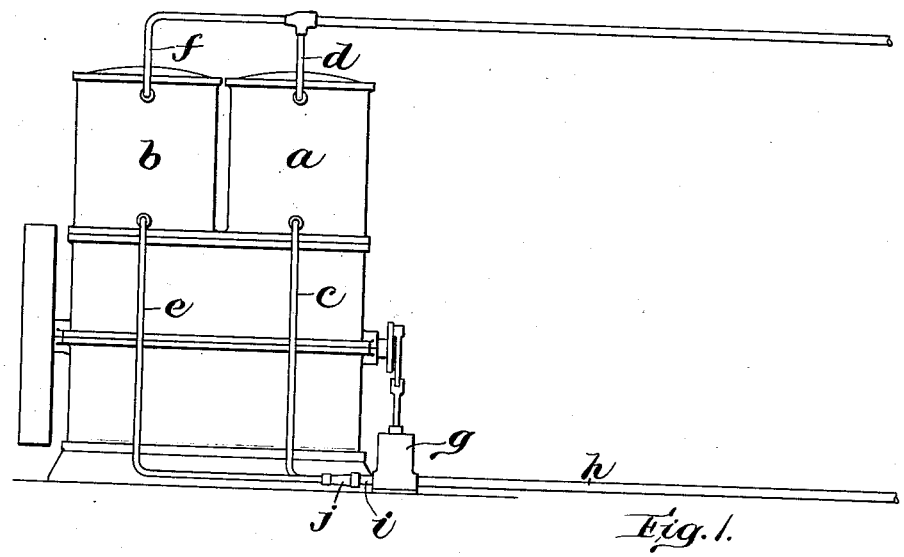

No. 884,326. PATENTED APR. 7, 1908.
V. J. EMERY.
MEANS FOR DISTRIBUTING WATER TO WATER JACKETS OF MULTIPLE CYLINDER ENGINES.
APPLICATION FILED JUNE 17, 1907.

Witnesses:
Arthur E. Randall
N. D. McPhail

Inventor:
Victor J. Emery
by
Phillips Van Everen & Fish
Atty.

UNITED STATES PATENT OFFICE.

VICTOR J. EMERY, OF QUINCY, MASSACHUSETTS, ASSIGNOR OF ONE-HALF TO MELLEN N. BRAY, OF BOSTON, MASSACHUSETTS.

MEANS FOR DISTRIBUTING WATER TO WATER-JACKETS OF MULTIPLE-CYLINDER ENGINES.

No. 884,326.  Specification of Letters Patent.  Patented April 7, 1908.

Application filed June 17, 1907. Serial No. 379,371.

*To all whom it may concern:*

Be it known that I, VICTOR J. EMERY, a citizen of the United States, residing at Quincy, in the county of Norfolk and State of Massachusetts, have invented certain new and useful Improvements in Means for Distributing Water to Water-Jackets of Multiple-Cylinder Engines; and I do hereby declare the following to be a full, clear, and exact description of the invention, such as will enable others skilled in the art to which it appertains to make and use the same.

The invention relates to means for securing an equal flow of water from a single pump or circulating device to the separate water jackets of multiple cylinder hydrocarbon or gas engines.

In supplying water to the different water jackets of multiple cylinder engines from a common pump or other circulating device, difficulty has been encountered in securing an equal flow of water to the different jackets under the varying conditions of use. It has been common practice in an endeavor to secure equal distribution to introduce controlling valves in the pipes leading to the jackets and to maintain a comparatively high pressure in the supply pipe, a release or waste valve being provided to allow the escape of any surplus in the supply pipe. It has been found however that it is necessary to continually vary the adjustment of the regulating valves in order to approximate an equal distribution of the water and that if adjusted satisfactorily for one condition, a change of conditions due to stopping or starting the engine for instance may and usually does require a readjustment of the regulating valves. This method of distribution has been objectionable therefore on account of its unreliability as well as on account of the power required to maintain the pressure in the supply pipe and also on account of the size of pump required.

It is the object of the present invention to provide an apparatus by which an equal distribution of water to the water jackets is insured under the varying conditions which may obtain during the running of the engine without change of adjustment and without the necessity of forcing the water through the pipes under heavy pressure. This I accomplish by inserting between the pump and water jackets a distributing device which subdivides the water entering its inlet opening and directs substantially equal parts thereof to the different outlet openings which communicate through separate piping with different water jackets.

The distributing device consists of a casing provided with an inlet adapted to connect with a pipe leading from the water supplying device, and two (or more) outlets, the combined areas of which are substantially equal to the area of the inlet and are separated by a partition (or by partitions) arranged substantially in line with the inlet and subdividing the inlet area into substantially equal parts. The water entering the inlet opening strikes against the end of the partition (or partitions) and is divided so that equal quantities flow to the outlet openings and thence through the pipes to the water jackets.

The invention will be understood from the above and from the following detailed description of the apparatus shown in the accompanying drawings.

Figure 3:
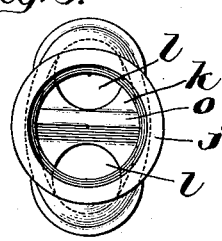
Figure 2:
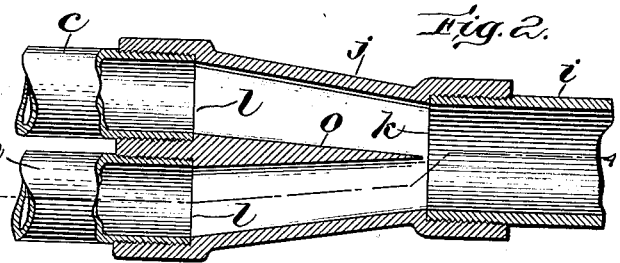
Figure 4:
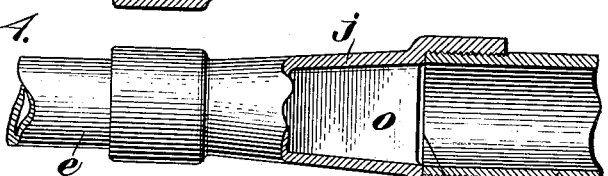

In these drawings Figure 1 is an elevation showing a multiple cylinder hydrocarbon engine provided with the invention; Fig. 2 is a horizontal sectional view through the distributing device; Fig. 3 is an end view looking towards the left in Fig. 2; Fig. 4 is a side elevation partly in section, and Fig. 5 is a horizontal sectional view of a distributer adapted for use in connection with an engine having three separate water jackets.

As indicated in Fig. 1 the engine is provided with a plurality of cylinders inclosed in the separate water jackets $a$, $b$. The water for the jacket $a$ is supplied through a pipe $c$ and discharged through a pipe $d$ while the water for the jacket $b$ is supplied through a pipe $e$ and discharged through a pipe $f$. The water is circulated or forced through the water jackets by the action of a pump $g$ driven from the engine and provided with a suction pipe $h$ and a delivery or supply pipe $i$. The water for both water jackets is supplied by the pump $g$ and is delivered by the supply pipe $i$ to a distributer by which the water forced through the pipe $i$ is subdivided and equal quantities directed into pipes $c$ and $e$.

The distributer comprises a casing $j$ having an inlet opening $k$ at one end and two outlet openings $l$ at the opposite end. The interior of the casing is subdivided by a partition $o$ which extends from the exit end towards the inlet end in line with the inlet opening $k$, the front end of the partition dividing the inlet opening area in halves. The outlet openings each have substantially one half the area of the inlet opening and are preferably arranged symmetrically with relation to the axis of the inlet opening and as nearly in line with the inlet opening as is practicable. The cross sectional shape of the passages on opposite sides of the partition $o$ preferably changes gradually from semicircular to circular so that the passage area is substantially constant from the inlet to the outlets. The inlet opening $k$ is threaded to receive the end of the pipe $i$ and the outlet openings $l$ are threaded to receive the ends of pipes $c$ and $e$. The water entering through the pipe $i$ strikes the end of the partition $o$ and is subdivided, equal volumes flowing on opposite sides of the partition and being delivered through the pipes $c$ and $e$ to the water jackets.

Figure 5:
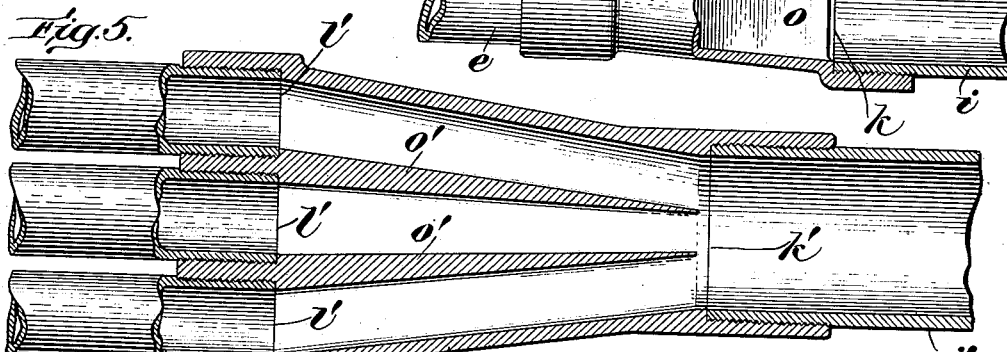

In Fig. 5 a distributing device is shown adapted to subdivide the water entering the inlet opening into three substantially equal parts and to deliver equal quantities of water to three different water jackets. As here shown the casing $j'$ of the distributing device is provided with a single inlet $k$ at one end and with three outlet openings $l'$. Each opening $l'$ has substantially one third the area of the inlet opening $k'$ and the adjacent outlet openings are separated by partitions $o'$ which extend from the outlet end towards the inlet end in line with the inlet and are arranged to subdivide the inlet area into three equal parts. In this case the water entering the inlet strikes against the ends of the partitions and is subdivided equal volumes flowing to the three outlet openings and thence to the different water jackets. In each case there is a single inlet opening at one end of the distributer casing and a plurality of outlet openings in the opposite end of the casing and adjacent outlet openings are separated by a partition extending from the outlet end towards and in line with the inlet end so that the inlet area is subdivided into equal areas corresponding in number to the number of outlet openings, and in each case the water entering the inlet opening is subdivided so that equal volumes flow to the different outlets and thence to the different water jackets.

What I claim is:—

1. A multiple cylinder engine having in combination a plurality of water jackets, a common water circulating device for supplying water thereto, a distributing device provided at one end with an inlet communicating with the circulating device, and at the opposite end with a plurality of outlets communicating with the respective water jackets, and with a partition between the adjacent outlets extending from the outlet end towards and in line with the inlet and so arranged that the inlet area is subdivided thereby into equal areas corresponding in number to the number of outlet openings, substantially as described.

2. A multiple cylinder engine having in combination a plurality of water jackets, a common water circulating device for supplying water thereto, a distributing device provided at one end with an inlet communicating with the circulating device and at the opposite end with a plurality of outlets the combined area of which is substantially equal to the area of the inlet, a partition between adjacent outlets extending from the outlet end towards and in line with the inlet and arranged to subdivide the inlet area into areas each of which is substantially equal to the corresponding outlet area, substantially as described.

3. A device for distributing water to the water jackets of multiple cylinder engines comprising a casing having an inlet opening at one end, a plurality of outlet openings in the opposite end, a partition between adjacent outlet openings extending from the outlet end towards and in line with the inlet opening and arranged to subdivide the inlet area into areas corresponding in size and number to the outlet openings, substantially as described.

4. A device for distributing water to the water jackets of multiple cylinder engines comprising a casing having an inlet opening at one end, a plurality of similar outlet openings at the opposite end, the combined area of which is substantially equal to the area of the inlet, a partition between adjacent outlet openings extending from the outlet end towards and in line with the inlet opening and dividing the inlet area into substantially equal areas corresponding in number to the number of the outlet openings, substantially as described.

5. A device for distributing water to the water jackets of multiple cylinder engines comprising a casing, a circular inlet opening at one end, a plurality of circular outlet openings at the opposite end the combined areas of which are substantially equal to the area of the inlet opening, a partition between adjacent outlet openings extending from the outlet end towards and in line with the inlet opening and arranged to divide the inlet area into substantially equal areas corresponding to the number of outlet openings and to subdivide the interior of the casing into passages the cross sectional areas of which are substantially constant from end to end, substantially as described.

In testimony whereof I affix my signature, in presence of two witnesses.

VICTOR J. EMERY.

Witnesses:
 IRA L. FISH,
 WILLIAM A. SARGENT.